（12） United States Patent
Qing et al.

(10) Patent No.: US 11,099,090 B2
(45) Date of Patent: Aug. 24, 2021

(54) DOUBLE-MEMBRANE CAPACITIVE PRESSURE SENSOR AND MANUFACTURING METHOD

(71) Applicants: Chuandong Magnetic Electronics Co., Ltd.., Foshan (CN); SOUTHEAST UNIVERSITY, Nanjing (CN)

(72) Inventors: Ming Qing, Nanjing (CN); ZhenJun Wang, Nanjing (CN); KeWen Long, Foshan (CN); HuaJuan He, Foshan (CN)

(73) Assignees: Chuandong Magnetic Electronics Co., Ltd.; SOUTHEAST UNIVERSITY

( * ) Notice: Subject to any disclaimer, the term of this patent is extended or adjusted under 35 U.S.C. 154(b) by 0 days.

(21) Appl. No.: 16/098,438

(22) PCT Filed: Jun. 22, 2018

(86) PCT No.: PCT/CN2018/092370
§ 371 (c)(1),
(2) Date: Nov. 1, 2018

(87) PCT Pub. No.: WO2019/019843
PCT Pub. Date: Jan. 31, 2019

(65) Prior Publication Data
US 2020/0319049 A1 Oct. 8, 2020

(30) Foreign Application Priority Data

Jul. 28, 2017 (CN) .......................... 201710632103.3
Jun. 22, 2018 (WO) ................ PCT/CN2018/092370

(51) Int. Cl.
*G01L 13/02* (2006.01)
*G01L 9/00* (2006.01)
(52) U.S. Cl.
CPC .......... *G01L 13/026* (2013.01); *G01L 9/0042* (2013.01); *G01L 9/0073* (2013.01)
(58) Field of Classification Search
CPC ..... G01L 19/147; G01L 9/0042; G01L 19/04; G01L 9/0054; G01L 9/0072;
(Continued)

(56) References Cited

U.S. PATENT DOCUMENTS 4,680,971 A * 7/1987 Kavli ..................... G01L 9/0051
361/283.1
4,735,098 A * 4/1988 Kavli ..................... G01L 9/0051
361/283.3
(Continued)

*Primary Examiner* — Andre J Allen

(57) ABSTRACT

A double-membrane capacitive pressure sensor comprising a glass substrate, wherein a shallow groove is formed in the center of the glass substrate; a shallow groove through-hole is formed in the center of the shallow groove, and the shallow groove through-hole extends from the bottom surface of the shallow groove to the bottom surface of the glass substrate; a capacitor C1 capable of measuring the low-pressure difference and a capacitor C2 capable of measuring the high-pressure difference are arranged above the shallow groove; the capacitor C1 capable of measuring the low-pressure difference comprises a bottom electrode plate and a thin pressure sensitive membrane, and the capacitor C2 capable of measuring the high-pressure difference comprises a thick pressure sensitive membrane and a top electrode plate.

10 Claims, 5 Drawing Sheets

(58) Field of Classification Search
CPC ... G01L 13/025; G01L 19/14; G01L 19/0038; G01L 19/0084; G01L 9/0055; G01L 9/0075; G01L 19/0069; G01L 9/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16

USPC .................................................. 73/700–756

See application file for complete search history.

(56) References Cited

U.S. PATENT DOCUMENTS

| | | | | |
|---|---|---|---|---|
| 4,974,117 A | * | 11/1990 | Irwin | ............... G01L 9/0075 361/283.4 |
| 5,277,068 A | * | 1/1994 | Fukiura | ............. G01L 9/0072 361/283.1 |
| 2007/0144264 A1 | * | 6/2007 | Silverbrook | ........... G01L 15/00 73/700 |
| 2015/0256940 A1 | * | 9/2015 | Dehe | .................... H04R 19/04 381/174 |
| 2015/0369680 A1 | * | 12/2015 | Ashino | ............. G01L 19/0084 73/726 |

* cited by examiner

DOUBLE-MEMBRANE CAPACITIVE PRESSURE SENSOR AND MANUFACTURING METHOD

TECHNICAL FIELD OF THE INVENTION

The present invention relates to the technical field of pressure sensors, and more particularly, to a double-membrane capacitive pressure sensor and a manufacturing method thereof. The present invention possesses a low-pressure section and a high-pressure section that are formed through combining a thick layer and a thin layer of pressure sensitive membranes in the stress direction, and achieves a higher measuring sensitivity.

BACKGROUND OF THE INVENTION

Pressure sensors are widely applied in the fields of medical treatment, sanitation, industrial manufacturing, automotive electronics and consumer electronics, etc. In the prior art, various pressure sensors are sold on the market. According to different measuring principles, pressure sensors are roughly divided into a strain type, a silicon piezoresistive type, a piezoelectric type, a capacitive type and a resonant type. As capacitive pressure sensors possess higher sensitivity and response speed, and are seldom influenced by temperature, they are widely used as upgraded products of piezoresistive ones. Its operating principle is to achieve a conversion from pressure signals to electric signals through utilizing the relation among the capacitance, the effective area of the electrode plates and the distance between the electrode plates. However, the measuring range and the sensitivity of traditional capacitive pressure sensors are interacted and mutually restricted due to their structural features. The measuring range is sacrificed to a higher sensitivity, resulting in a limited application range of them.

SUMMARY OF THE INVENTION

The purpose of the present invention is to solve the shortcomings in the prior art by providing a double-membrane capacitive pressure sensor and a manufacturing method thereof. The measuring structure is mainly composed of two layers of pressure sensitive membranes with different thicknesses and two fixed layers of electrode plates. This structure sequentially comprises a bottom electrode plate, a thin pressure sensitive membrane, a thick pressure sensitive membrane and a top electrode plate from bottom to top. A supporting material is sandwiched between the thin pressure sensitive membrane and the thick pressure membrane for forming a certain interval. An insulating supporting material is sandwiched between the thick pressure sensitive membrane and the top electrode plate for forming an electric isolation. In this arrangement, the capacitor C1 capable of measuring the low-pressure difference comprises a bottom electrode plate and a thin pressure sensitive membrane, and the capacitor C2 capable of measuring the high-pressure difference comprises a thick pressure sensitive membrane and a top electrode plate. When a slight pressure difference acts on the sensor, the thin pressures sensitive membrane is stressed to deform, and the capacitance of capacitor C1 decreases accordingly. When the maximum deformation of the thin pressure sensitive film exceeds the distance between the thin pressure sensitive membrane and the thick pressure sensitive membrane, the thin pressure sensitive membrane is in contact with the thick pressure sensitive membrane so that the pressure can be transmitted to the thick pressure sensitive membrane. At this point, the capacitance of capacitor C2 increases along with the increase of the pressure, and a precise pressure measurement can be achieved by capacitor C2. Through the combination of the two layers of pressure sensitive membranes, a wide measuring range of the capacitive pressure sensor can be achieved without sacrificing the sensitivity.

To achieve the above purpose, the present invention adopts the following technical solution:

A double-membrane capacitive pressure sensor comprising a glass substrate, wherein a shallow groove is formed in the center of the glass substrate; a shallow groove through-hole is formed in the center of the shallow groove, and the shallow groove through-hole extends from the bottom surface of the shallow groove to the bottom surface of the glass substrate; a capacitor C1 capable of measuring the low-pressure difference and a capacitor C2 capable of measuring the high-pressure difference are arranged above the shallow groove; the capacitor C1 capable of measuring the low-pressure difference comprises a bottom electrode plate and a thin pressure sensitive membrane, and the capacitor C2 capable of measuring the high-pressure difference comprises a thick pressure sensitive membrane and a top electrode plate; the shallow groove through-hole is arranged corresponding to the capacitor C1 capable of measuring the low-pressure difference, and the capacitor C1 capable of measuring the low-pressure difference is arranged corresponding to the capacitor C2 capable of measuring the high-pressure difference.

In another aspect of the present invention, the bottom electrode plate covers the bottom surface of the shallow groove, and the thin pressure sensitive membrane covers the upper surface of the glass substrate. A first supporting material is arranged between the thick pressure sensitive membrane and the thin pressure sensitive membrane, and a second supporting material is arranged between the top electrode plate and the thick pressure sensitive membrane.

In another aspect of the present invention, a bottom electrode plate through-hole is formed in the center of the bottom electrode plate. The bottom electrode plate through-hole and the shallow groove through-hole are correspondingly arranged.

In another aspect of the present invention, the first supporting material is arranged on the periphery of the upper surface of the thin pressure sensitive membrane, and is flush with the groove wall of the shallow groove. The second supporting material is arranged on the periphery of the upper surface of the thick pressure sensitive membrane, and is flush with the groove wall of the shallow groove.

In another aspect of the present invention, a top electrode plate through-hole is formed in the center of the top electrode plate, and a thick pressure sensitive membrane through-hole is formed in the center of the thick pressure sensitive membrane.

A manufacturing method of the double-membrane capacitive pressure sensor, comprising the steps of:

Step 1: preparing a cleaned glass substrate, and etching a shallow groove in the center of the surface of the glass substrate by a hydrofluoric acid solution;

Step 2: etching a shallow groove through-hole in the center of the shallow groove of the glass substrate by a hydrofluoric acid solution or laser drilling technology, wherein the shallow groove through-hole extends from the upper surface to the bottom surface of the glass substrate;

Step 3: depositing and photoetching on the surface of the shallow groove of the glass substrate through a magnetron sputtering method, thereby forming an aluminum layer thereon; subsequently, removing the aluminum in the center through a stripping technology, wherein the rest part serves as the bottom electrode plate;

Step 4: preparing a cleaned SOI wafer, wherein its three layers of materials are respectively a thin silicon layer, a silicon-dioxide dielectric layer and a bulk silicon layer from top to bottom;

Step 5: bonding the upper surface of the glass substrate and that of the thin silicon layer through an anodic bonding technology, thereby forming a bonding interface between the glass substrate and the SOI wafer, wherein the thin silicon layer located above the shallow groove serves as the thin pressure sensitive membrane of the sensor;

Step 6: thinning the bulk silicon layer of the SOI wafer to a certain thickness through a chemical mechanical polishing technology, thus enabling it to serve as the thick pressure sensitive membrane of the sensor;

Step 7: etching a thick pressure sensitive membrane through-hole in the center of the bulk silicon layer by a hydrofluoric acid solution;

Step 8: depositing a layer of silicon dioxide on the bulk silicon layer through a chemical vapor deposition technology;

Step 9: depositing metal chromium on the silicon-dioxide layer deposited in step 8 through a magnetron sputtering method, and removing the chromium in the center through a stripping technology, wherein the rest part serves as the top electrode plate;

Step 10: using a hydrofluoric acid solution to etch off the silicon-dioxide dielectric layer in step 4, and saving the peripheral portion as the first supporting material; using a hydrofluoric acid solution to etch off the layer of silicon dioxide in step 8, and saving the peripheral portion as the second supporting material; subsequently, releasing the thin pressure sensitive membrane and the thick pressure sensitive membrane of the sensor.

Compared with the prior art, the present invention has the following advantages:

First, the present invention adopts a variable-distance principle to achieve the conversion from pressure to capacitance; the capacitor C1 capable of measuring the low-pressure difference and the capacitor C2 capable of measuring the high-pressure difference respectively precisely measure the low-pressure section and the high-pressure section; as a result, the pressure measuring precision is improved, and the measuring range of the sensor is also extended;

Second, the organic combination of the thick pressure sensitive membrane and the thin pressure sensitive membrane effectively solves the technical problem relating to the overload protection of the thin pressure sensitive membrane during the high-pressure measurement; therefore, the measuring range of the sensor is greatly extended and the reliability is significantly enhanced;

Third, both the thin pressure sensitive membrane and the thick pressure sensitive membrane adopt a vertical structure; thus, the chip area is saved, the packaging size is reduced, and the production cost is lowered.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

MARKING INSTRUCTIONS OF THE DRAWINGS

1. Bottom Electrode Plate, 10. Bottom Electrode Plate Through-hole, 2. Thin Pressure Sensitive Membrane, 3. Thick Pressure Sensitive Membrane, 30. Thick Pressure Sensitive Membrane Through-hole, 4. Top Electrode Plate, 40. Top Electrode Plate Through-hole, 5. The First Supporting Material, 6. The Second Supporting Material, 7. Glass Substrate, 70. Shallow Groove, 71. Shallow Groove Through-hole

DETAILED DESCRIPTION OF THE INVENTION

Drawings and detailed embodiments are combined hereinafter to elaborate the technical principles of the present invention.

Figure 1:
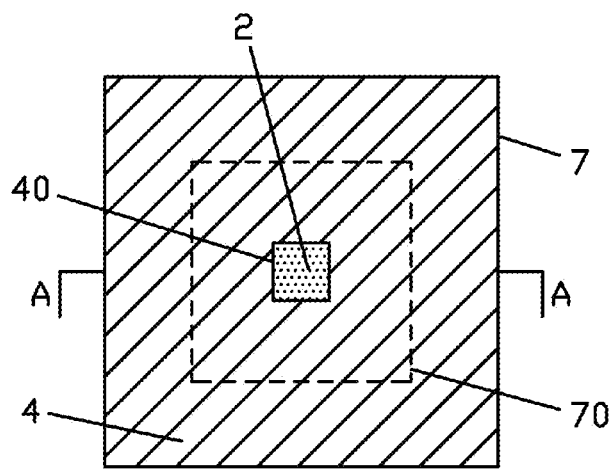
FIG. 1 is a top view of the present invention.
Figure 2:
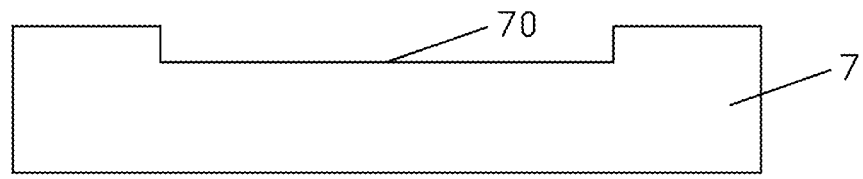
FIG. 2 is a sectional view taken along line A-A in FIG. 1 of the present invention.

As shown in FIGS. 1-2, the double-membrane capacitive pressure sensor of the present invention comprises a glass substrate 7, wherein a shallow groove 70 is formed in the center of the glass substrate 7. A shallow groove through-hole 71 is formed in the center of the shallow groove 70, and the shallow groove through-hole 71 extends from the bottom surface of the shallow groove 70 to the bottom surface of the glass substrate 7. A capacitor C1 capable of measuring the low-pressure difference and a capacitor C2 capable of measuring the high-pressure difference are arranged above the shallow groove 70. The capacitor C1 capable of measuring the low-pressure difference comprises a bottom electrode plate 1 and a thin pressure sensitive membrane 2, and the capacitor C2 capable of measuring the high-pressure difference comprises a thick pressure sensitive membrane 3 and a top electrode plate 4. The shallow groove through-hole 71 is arranged corresponding to the capacitor C1 capable of measuring the low-pressure difference, and the capacitor C1 capable of measuring the low-pressure difference is arranged corresponding to the capacitor C2 capable of measuring the high-pressure difference. The aforesaid forms the basic structure of the present invention.

The operating principle of the present invention is the following:

The pressure upwardly acts on the entire sensor surface (namely, the bottom surface of the glass substrate) through the shallow groove through-hole 71. When the pressure is low, the thin pressure sensitive membrane 2 is bent upwards, and the capacitance of capacitor C1 that is composed of the thin pressure sensitive membrane 2 and the bottom electrode plate 1 is decreased along with the increase of the pressure. When the pressure reaches a certain value, the thin pressure sensitive membrane 2 is bent upwards and is in contact with the thick pressure sensitive membrane 3, thereby preventing the thin pressure sensitive membrane 2 from cracking under the high pressure. At this point, the thin pressure sensitive membrane 2 and the thick pressure sensitive membrane 3 are combined into a composite membrane. On the high-pressure section, the capacitance of capacitor C2 that is composed of the composite membrane and the top electrode plate 4 is increased along with the increase of the pressure, and its sensitivity is improved as well. In the present invention, a variable-distance principle is utilized for achieving the conversion from pressure to capacitance. The capacitor C1 capable of measuring the low-pressure difference and the capacitor C2 capable of measuring the high-pressure difference respectively precisely measure the low-pressure section and the high-pressure section. As a result, the pressure measuring precision is improved, and the measuring range of the sensor is also extended. Furthermore, by means of the thick pressure sensitive membrane 3 of the present invention, the technical problem relating to the overload protection of the thin pressure sensitive membrane 2 during the high-pressure measurement can be effectively solved. Thus, the measuring range of the sensor is greatly extended and the reliability is significantly enhanced.

More specifically, the bottom electrode plate 1 covers the bottom surface of the shallow groove 70, and the thin pressure sensitive membrane 2 covers the upper surface of the glass substrate 7. A first supporting material 5 is arranged between the thick pressure sensitive membrane 3 and the thin pressure sensitive membrane 2, and a second supporting material 6 is arranged between the top electrode plate 4 and the thick pressure sensitive membrane 3. In this design, both the thin pressure sensitive membrane 2 and the thick pressure sensitive membrane 3 adopt a vertical structure. Thus, the chip area is saved, the packaging size is reduced, and the production cost is lowered. Meanwhile, the organic combination of the thick pressure sensitive membrane 3 and the thin pressure sensitive membrane 2 effectively solves the technical problem relating to the overload protection of the thin pressure sensitive membrane 2 during the high-pressure measurement. Therefore, the measuring range of the sensor is greatly extended and the reliability is significantly enhanced.

Additionally, a bottom electrode plate through-hole 10 is formed in the center of the bottom electrode plate 1, and the bottom electrode plate through-hole 10 and the shallow groove through-hole 71 are correspondingly arranged. According to this arrangement, pressure-difference signals can be conveniently introduced. The pressure difference upwardly acts on the pressure sensitive membrane through the shallow groove through-hole 71. The pressure sensitive membrane senses the pressure, and is bent upwards. Thus, the capacitance of the capacitor composed of the pressure sensitive membrane and the electrode plate can vary.

Moreover, the first supporting material 5 is arranged on the periphery of the upper surface of the thin pressure sensitive membrane 2, and is flush with the groove wall of the shallow groove 70. The second supporting material 6 is arranged on the periphery of the upper surface of the thick pressure sensitive membrane 3, and is flush with the groove wall of the shallow groove 70. In this arrangement, the first supporting material 5 is used for releasing the thin pressure sensitive membrane 2 so that the thin pressure sensitive membrane 2 can be conveniently bent under the low pressure, and the second supporting material 6 is used for releasing the thick pressure sensitive membrane 3 so that the thick pressure sensitive membrane 3 can be conveniently bent under the high pressure.

A top electrode plate through-hole 40 is formed in the center of the top electrode plate 4, and a thick pressure sensitive membrane through-hole 30 is formed in the center of the thick pressure sensitive membrane 3. According to this design, the pressure difference can conveniently act on the thin pressure sensitive membrane 2.

Figure 3:
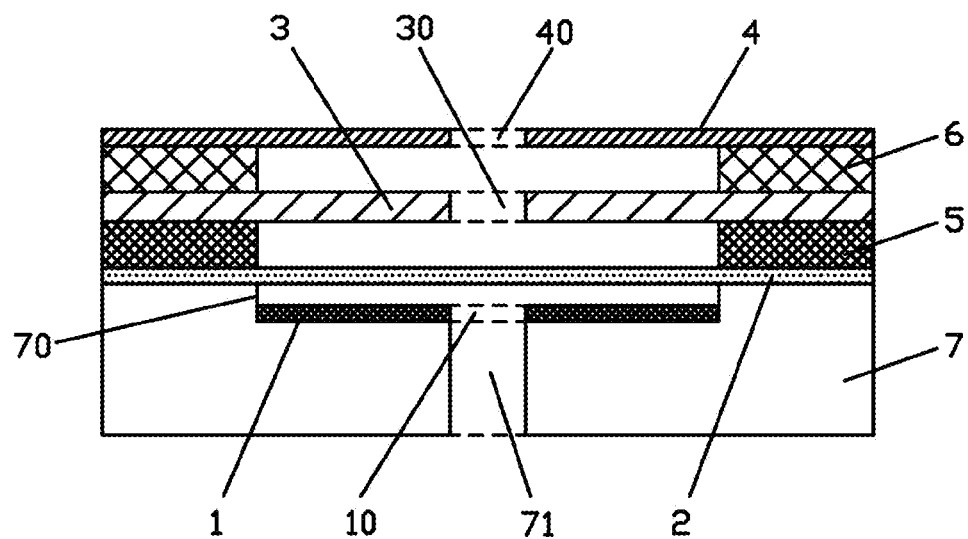
FIGS. 3-12 are schematic diagrams illustrating the manufacturing process of the present invention.
Figure 4:
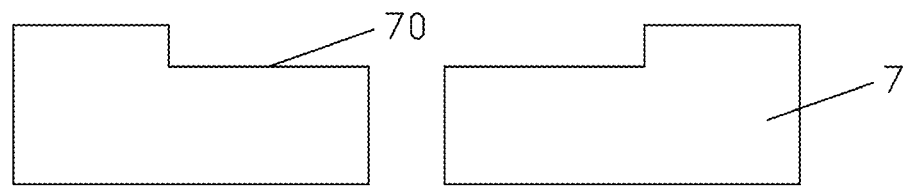
Figure 5:
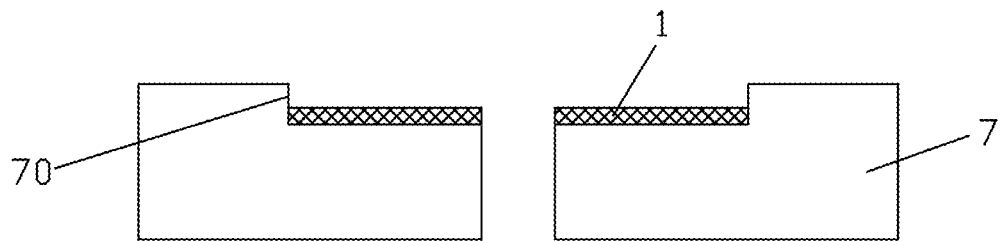
Figure 6:
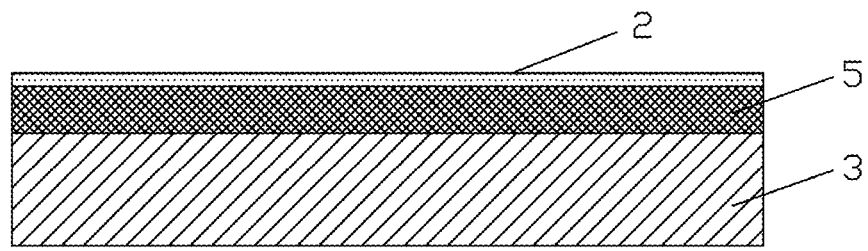
Figure 7:
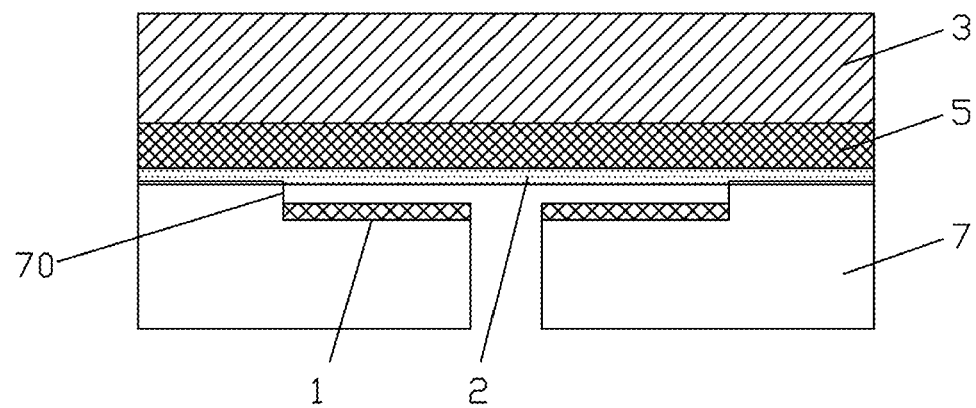
Figure 8:
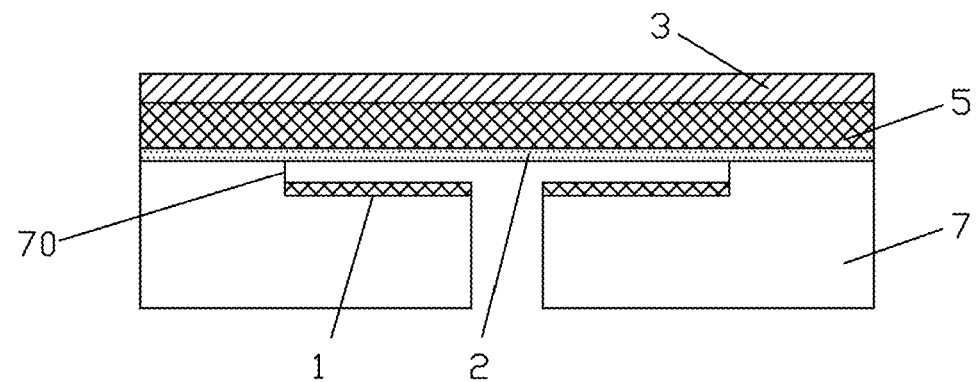
Figure 9:
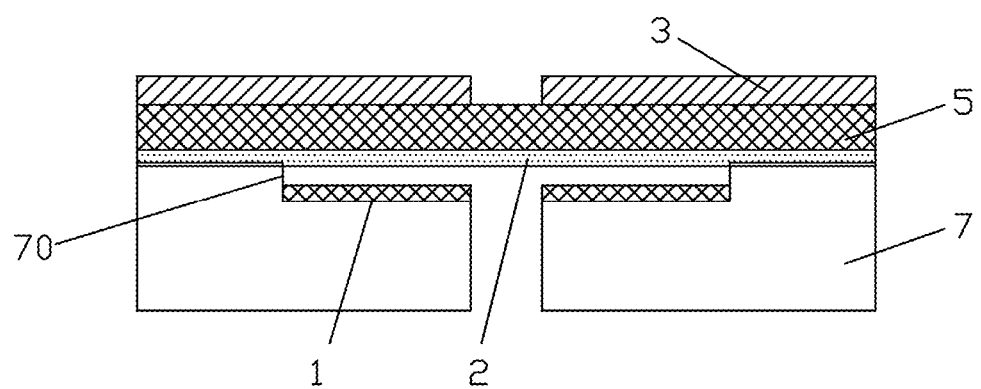
Figure 10:
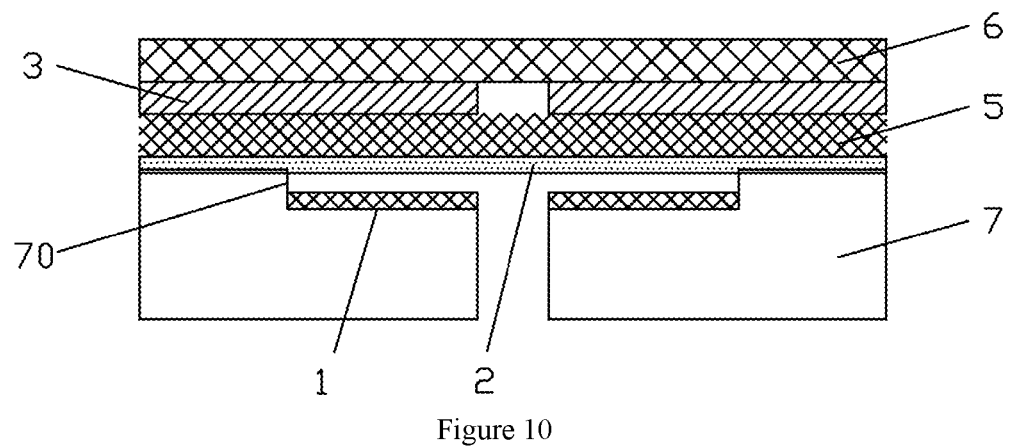
Figure 11:
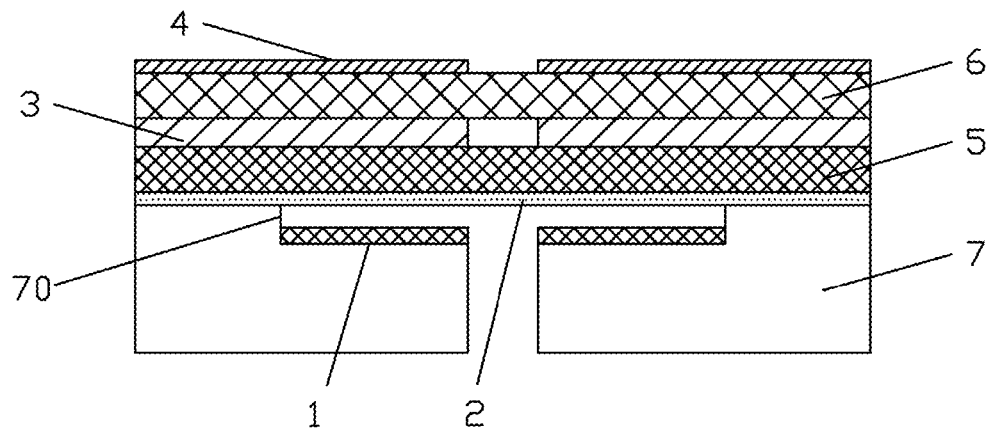
Figure 12:
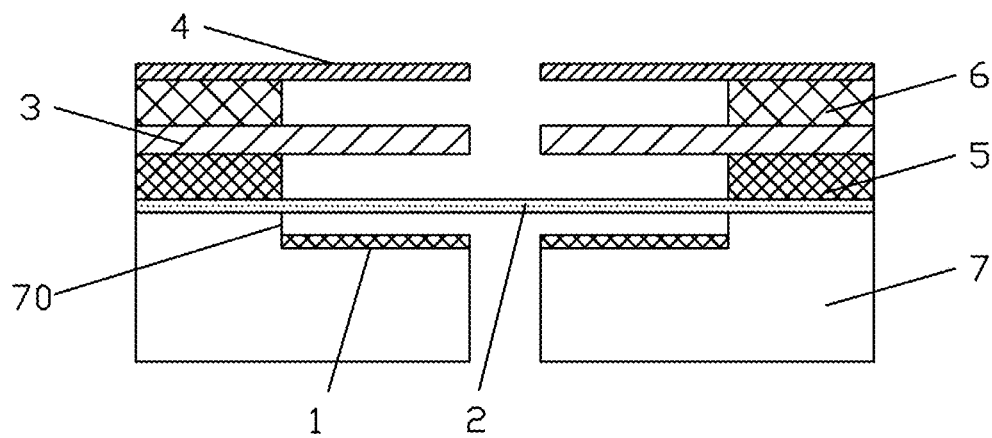

A manufacturing method of the double-membrane capacitive pressure sensor, comprising the steps of:

Step 1: preparing a cleaned glass substrate 7, and etching a shallow groove 70 (as shown in FIG. 3) in the center of the surface of the glass substrate 7 by a hydrofluoric acid solution;

Step 2: etching a shallow groove through-hole 71 in the center of the shallow groove 70 of the glass substrate 7 by a hydrofluoric acid solution or laser drilling technology, wherein the shallow groove through-hole 71 extends from the upper surface to the bottom surface of the glass substrate 7 (as shown in FIG. 4);

Step 3: depositing and photoetching on the surface of the shallow groove 70 of the glass substrate 7 via a magnetron sputtering method, thereby forming an aluminum layer thereon; subsequently, removing the aluminum in the center through a stripping technology, wherein the rest part serves as the bottom electrode plate 1 (as shown in FIG. 5);

Step 4: preparing a cleaned SOI wafer, wherein its three layers of materials are respectively a thin silicon layer, a silicon-dioxide dielectric layer and a bulk silicon layer from top to bottom (as shown in FIG. 6);

Step 5: bonding the upper surface of the glass substrate 7 and that of the thin silicon layer through an anodic bonding technology, thereby forming a bonding interface between the glass substrate 7 and the SOI wafer, wherein the thin silicon layer located above the shallow groove 70 serves as the thin pressure sensitive membrane 2 of the sensor (as shown in FIG. 7);

Step 6: thinning the bulk silicon layer of the SOI wafer to a certain thickness through a chemical mechanical polishing technology so that it can serve as the thick pressure sensitive membrane 3 of the sensor 3 (as shown in FIG. 8);

Step 7: etching a thick pressure sensitive membrane through-hole 30 in the center of the bulk silicon layer by a hydrofluoric acid solution (as shown in FIG. 9);

Step 8: depositing a layer of silicon dioxide on the bulk silicon layer through a chemical vapor deposition technology (as shown in FIG. 10);

Step 9: depositing metal chromium on the silicon-dioxide layer deposited in step 8 through a magnetron sputtering method, and removing the chromium in the center through a stripping technology, wherein the rest part serves as the top electrode plate 4 (as shown in FIG. 11);

Step 10: using a hydrofluoric acid solution to etch off the silicon-dioxide dielectric layer in the step 4, and saving the peripheral portion as a first supporting material 5; using a hydrofluoric acid solution to etch off the layer of silicon dioxide in step 8, and saving the peripheral portion as a second supporting material 6; subsequently, releasing the thin pressure sensitive membrane 2 and the thick pressure sensitive membrane 3 of the sensor (as shown in FIG. 12).

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A double-membrane capacitive pressure sensor, comprising:

a glass substrate, wherein a shallow groove is formed in the center of the glass substrate, wherein a shallow groove through-hole is formed in the center of the shallow groove, and the shallow groove through-hole extends from the bottom surface of the shallow groove to the bottom surface of the glass substrate, wherein a capacitor C and a capacitor C2 are arranged above the shallow groove, wherein the capacitor C1 comprises a bottom electrode plate and a thin pressure sensitive membrane, and the capacitor C2 comprises a thick pressure sensitive membrane and a top electrode plate, wherein the shallow groove through-hole is arranged corresponding to the capacitor C1, and the capacitor C1 is arranged corresponding to the capacitor C2.

2. The double-membrane capacitive pressure sensor of claim 1, wherein the bottom electrode plate covers the bottom surface of the shallow groove, and the thin pressure sensitive membrane covers the upper surface of the glass substrate, wherein a first supporting material is arranged between the thick pressure sensitive membrane and the thin pressure sensitive membrane, and a second supporting material is arranged between the top electrode plate and the thick pressure sensitive membrane.

3. The double-membrane capacitive pressure sensor of claim 2, wherein the first supporting material is arranged on the periphery of the upper surface of the thin pressure sensitive membrane, and is flush with the groove wall of the shallow groove, wherein the second supporting material is arranged on the periphery of the upper surface of the thick pressure sensitive membrane, and is flush with the groove wall of the shallow groove.

4. A manufacturing method of the double-membrane capacitive pressure sensor of claim 3, comprising the steps of:
    Step 1: preparing a cleaned glass substrate, and etching a shallow groove in the center of the surface of the glass substrate by a hydrofluoric acid solution;
    Step 2: etching a shallow groove through-hole in the center of the shallow groove of the glass substrate by a hydrofluoric acid solution or laser drilling technology, wherein the shallow groove through-hole extends from the upper surface to the bottom surface of the glass substrate;
    Step 3: depositing and photoetching on the surface of the shallow groove of the glass substrate through a magnetron sputtering method, thereby forming an aluminum layer thereon; subsequently, removing the aluminum in the center through a stripping technology, wherein the rest part serves as the bottom electrode plate;
    Step 4: preparing a cleaned SOI wafer, wherein its three layers of materials are respectively a thin silicon layer, a silicon-dioxide dielectric layer and a bulk silicon layer from top to bottom;
    Step 5: bonding the upper surface of the glass substrate and that of the thin silicon layer through an anodic bonding technology, thereby forming a bonding interface between the glass substrate and the SOI wafer, wherein the thin silicon layer located above the shallow groove serves as the thin pressure sensitive membrane of the sensor;
    Step 6: thinning the bulk silicon layer of the SOI wafer to a certain thickness through a chemical mechanical polishing technology, thus enabling it to serve as the thick pressure sensitive membrane of the sensor;
    Step 7: etching a thick pressure sensitive membrane through-hole in the center of the bulk silicon layer by a hydrofluoric acid solution;
    Step 8: depositing a layer of silicon dioxide on the bulk silicon layer through a chemical vapor deposition technology;
    Step 9: depositing metal chromium on the silicon-dioxide layer deposited in step 8 through a magnetron sputtering method, and removing the chromium in the center through a stripping technology, wherein the rest part serves as the top electrode plate;
    Step 10: using a hydrofluoric acid solution to etch off the silicon-dioxide dielectric layer in step 4, and saving the peripheral portion as the first supporting material; using a hydrofluoric acid solution to etch off the layer of silicon dioxide in step 8, and saving the peripheral portion as the second supporting material; subsequently, releasing the thin pressure sensitive membrane and the thick pressure sensitive membrane of the sensor.

5. The double-membrane capacitive pressure sensor of claim 2, wherein a top electrode plate through-hole is formed in the center of the top electrode plate, and a thick pressure sensitive membrane through-hole is formed in the center of the thick pressure sensitive membrane.

6. A manufacturing method of the double-membrane capacitive pressure sensor of claim 5, comprising the steps of:
    Step 1: preparing a cleaned glass substrate, and etching a shallow groove in the center of the surface of the glass substrate by a hydrofluoric acid solution;
    Step 2: etching a shallow groove through-hole in the center of the shallow groove of the glass substrate by a hydrofluoric acid solution or laser drilling technology, wherein the shallow groove through-hole extends from the upper surface to the bottom surface of the glass substrate;
    Step 3: depositing and photoetching on the surface of the shallow groove of the glass substrate through a magnetron sputtering method, thereby forming an aluminum layer thereon; subsequently, removing the aluminum in the center through a stripping technology, wherein the rest part serves as the bottom electrode plate;
    Step 4: preparing a cleaned SOI wafer, wherein its three layers of materials are respectively a thin silicon layer, a silicon-dioxide dielectric layer and a bulk silicon layer from top to bottom;
    Step 5: bonding the upper surface of the glass substrate and that of the thin silicon layer through an anodic bonding technology, thereby forming a bonding interface between the glass substrate and the SOI wafer, wherein the thin silicon layer located above the shallow groove serves as the thin pressure sensitive membrane of the sensor;
    Step 6: thinning the bulk silicon layer of the SOI wafer to a certain thickness through a chemical mechanical polishing technology, thus enabling it to serve as the thick pressure sensitive membrane of the sensor;
    Step 7: etching a thick pressure sensitive membrane through-hole in the center of the bulk silicon layer by a hydrofluoric acid solution;
    Step 8: depositing a layer of silicon dioxide on the bulk silicon layer through a chemical vapor deposition technology;
    Step 9: depositing metal chromium on the silicon-dioxide layer deposited in step 8 through a magnetron sputtering method, and removing the chromium in the center through a stripping technology, wherein the rest part serves as the top electrode plate;

Step 10: using a hydrofluoric acid solution to etch off the silicon-dioxide dielectric layer in step 4, and saving the peripheral portion as the first supporting material; using a hydrofluoric acid solution to etch off the layer of silicon dioxide in step 8, and saving the peripheral portion as the second supporting material; subsequently, releasing the thin pressure sensitive membrane and the thick pressure sensitive membrane of the sensor.

7. A manufacturing method of the double-membrane capacitive pressure sensor of claim 2, comprising the steps of:

Step 1: preparing a cleaned glass substrate, and etching a shallow groove in the center of the surface of the glass substrate by a hydrofluoric acid solution;

Step 2: etching a shallow groove through-hole in the center of the shallow groove of the glass substrate by a hydrofluoric acid solution or laser drilling technology, wherein the shallow groove through-hole extends from the upper surface to the bottom surface of the glass substrate;

Step 3: depositing and photoetching on the surface of the shallow groove of the glass substrate through a magnetron sputtering method, thereby forming an aluminum layer thereon; subsequently, removing the aluminum in the center through a stripping technology, wherein the rest part serves as the bottom electrode plate;

Step 4: preparing a cleaned SOI wafer, wherein its three layers of materials are respectively a thin silicon layer, a silicon-dioxide dielectric layer and a bulk silicon layer from top to bottom;

Step 5: bonding the upper surface of the glass substrate and that of the thin silicon layer through an anodic bonding technology, thereby forming a bonding interface between the glass substrate and the SOI wafer, wherein the thin silicon layer located above the shallow groove serves as the thin pressure sensitive membrane of the sensor;

Step 6: thinning the bulk silicon layer of the SOI wafer to a certain thickness through a chemical mechanical polishing technology, thus enabling it to serve as the thick pressure sensitive membrane of the sensor;

Step 7: etching a thick pressure sensitive membrane through-hole in the center of the bulk silicon layer by a hydrofluoric acid solution;

Step 8: depositing a layer of silicon dioxide on the bulk silicon layer through a chemical vapor deposition technology;

Step 9: depositing metal chromium on the silicon-dioxide layer deposited in step 8 through a magnetron sputtering method, and removing the chromium in the center through a stripping technology, wherein the rest part serves as the top electrode plate;

Step 10: using a hydrofluoric acid solution to etch off the silicon-dioxide dielectric layer in step 4, and saving the peripheral portion as the first supporting material; using a hydrofluoric acid solution to etch off the layer of silicon dioxide in step 8, and saving the peripheral portion as the second supporting material; subsequently, releasing the thin pressure sensitive membrane and the thick pressure sensitive membrane of the sensor.

8. The double-membrane capacitive pressure sensor of claim 1, wherein a bottom electrode plate through-hole is formed in the center of the bottom electrode plate, wherein the bottom electrode plate through-hole and the shallow groove through-hole are correspondingly arranged.

9. A manufacturing method of the double-membrane capacitive pressure sensor of claim 8, comprising the steps of:

Step 1: preparing a cleaned glass substrate, and etching a shallow groove in the center of the surface of the glass substrate by a hydrofluoric acid solution;

Step 2: etching a shallow groove through-hole in the center of the shallow groove of the glass substrate by a hydrofluoric acid solution or laser drilling technology, wherein the shallow groove through-hole extends from the upper surface to the bottom surface of the glass substrate;

Step 3: depositing and photoetching on the surface of the shallow groove of the glass substrate through a magnetron sputtering method, thereby forming an aluminum layer thereon; subsequently, removing the aluminum in the center through a stripping technology, wherein the rest part serves as the bottom electrode plate;

Step 4: preparing a cleaned SOI wafer, wherein its three layers of materials are respectively a thin silicon layer, a silicon-dioxide dielectric layer and a bulk silicon layer from top to bottom;

Step 5: bonding the upper surface of the glass substrate and that of the thin silicon layer through an anodic bonding technology, thereby forming a bonding interface between the glass substrate and the SOI wafer, wherein the thin silicon layer located above the shallow groove serves as the thin pressure sensitive membrane of the sensor;

Step 6: thinning the bulk silicon layer of the SOI wafer to a certain thickness through a chemical mechanical polishing technology, thus enabling it to serve as the thick pressure sensitive membrane of the sensor;

Step 7: etching a thick pressure sensitive membrane through-hole in the center of the bulk silicon layer by a hydrofluoric acid solution;

Step 8: depositing a layer of silicon dioxide on the bulk silicon layer through a chemical vapor deposition technology;

Step 9: depositing metal chromium on the silicon-dioxide layer deposited in step 8 through a magnetron sputtering method, and removing the chromium in the center through a stripping technology, wherein the rest part serves as the top electrode plate;

Step 10: using a hydrofluoric acid solution to etch off the silicon-dioxide dielectric layer in step 4, and saving the peripheral portion as the first supporting material; using a hydrofluoric acid solution to etch off the layer of silicon dioxide in step 8, and saving the peripheral portion as the second supporting material; subsequently, releasing the thin pressure sensitive membrane and the thick pressure sensitive membrane of the sensor.

10. A manufacturing method of the double-membrane capacitive pressure sensor of claim 1, comprising the steps of:

Step 1: preparing a cleaned glass substrate, and etching a shallow groove in the center of the surface of the glass substrate by a hydrofluoric acid solution;

Step 2: etching a shallow groove through-hole in the center of the shallow groove of the glass substrate by a hydrofluoric acid solution or laser drilling technology, wherein the shallow groove through-hole extends from the upper surface to the bottom surface of the glass substrate;

Step 3: depositing and photoetching on the surface of the shallow groove of the glass substrate through a magnetron sputtering method, thereby forming an aluminum layer thereon; subsequently, removing the aluminum in the center through a stripping technology, wherein the rest part serves as the bottom electrode plate;

Step 4: preparing a cleaned SOI wafer, wherein its three layers of materials are respectively a thin silicon layer, a silicon-dioxide dielectric layer and a bulk silicon layer from top to bottom;

Step 5: bonding the upper surface of the glass substrate and that of the thin silicon layer through an anodic bonding technology, thereby forming a bonding interface between the glass substrate and the SOI wafer, wherein the thin silicon layer located above the shallow groove serves as the thin pressure sensitive membrane of the sensor;

Step 6: thinning the bulk silicon layer of the SOI wafer to a certain thickness through a chemical mechanical polishing technology, thus enabling it to serve as the thick pressure sensitive membrane of the sensor;

Step 7: etching a thick pressure sensitive membrane through-hole in the center of the bulk silicon layer by a hydrofluoric acid solution;

Step 8: depositing a layer of silicon dioxide on the bulk silicon layer through a chemical vapor deposition technology;

Step 9: depositing metal chromium on the silicon-dioxide layer deposited in step 8 through a magnetron sputtering method, and removing the chromium in the center through a stripping technology, wherein the rest part serves as the top electrode plate;

Step 10: using a hydrofluoric acid solution to etch off the silicon-dioxide dielectric layer in step 4, and saving the peripheral portion as the first supporting material; using a hydrofluoric acid solution to etch off the layer of silicon dioxide in step 8, and saving the peripheral portion as the second supporting material; subsequently, releasing the thin pressure sensitive membrane and the thick pressure sensitive membrane of the sensor.

\* \* \* \* \*